Aug. 8, 1933.    G. E. KERSHAW    1,921,678
METHOD OF INCREASING POWER OF TURBINE PLANTS
Filed Jan. 22, 1930    2 Sheets-Sheet 2
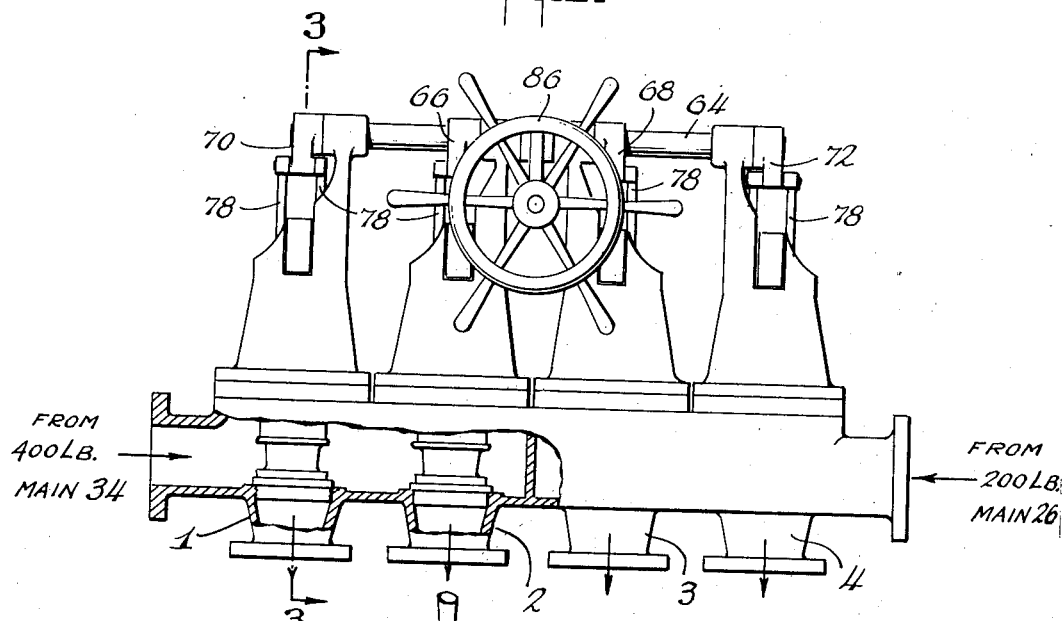
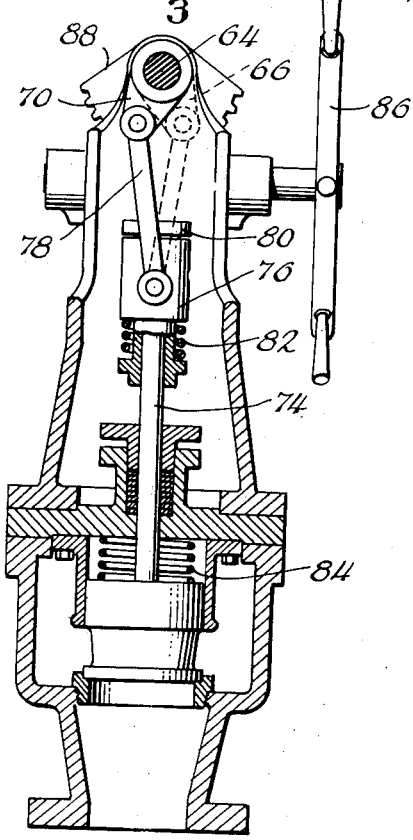
George E. Kershaw,
INVENTOR
BY
ATTORNEY Patented Aug. 8, 1933

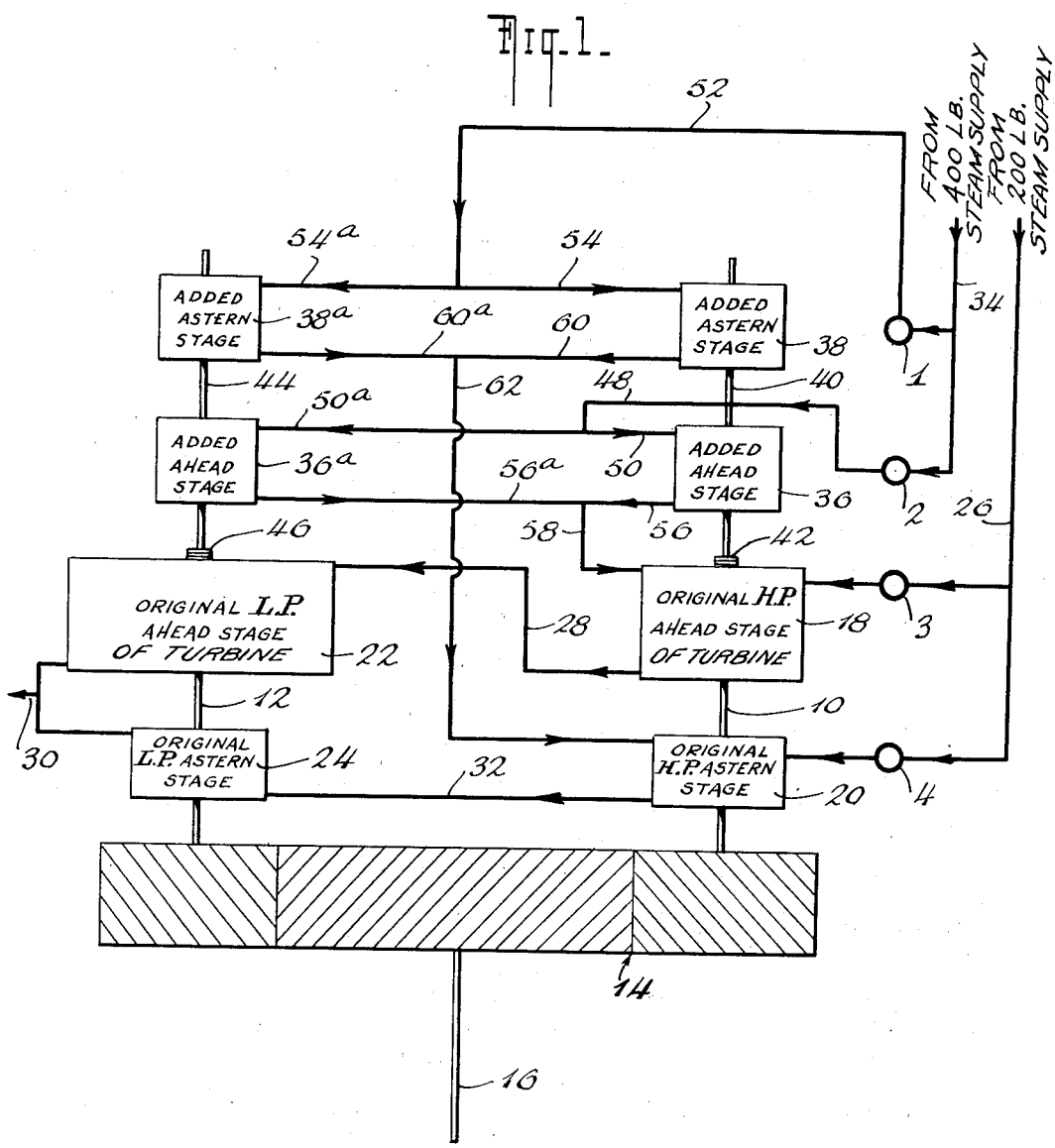

1,921,678

UNITED STATES PATENT OFFICE 1,921,678

METHOD OF INCREASING POWER OF TURBINE PLANTS

George E. Kershaw, East Orange, N. J., assignor to The Superheater Company, New York, N. Y.

Application January 22, 1930. Serial No. 422,587

3 Claims. (Cl. 60—70)

My invention relates to turbine power plants and aims to provide a method and apparatus whereby desired increases in horse power of existing turbine plants can be obtained at a relatively small cost.

Changing commercial conditions demand a higher average speed in ships than was formerly the case; hence many ships are now found to have less horse power than required to drive them at the speed giving best commercial returns. If the original power plant of the ship is forced sufficiently to give the desired speed, the rate of deterioration and the thermal losses usually become excessive, while the space available for additions is limited, and a complete new plant is expensive and usually not economically warranted by the probable life of the ship's hull.

I have found, however, that it is possible to avoid the difficulties above mentioned and to add largely to the horse power of the majority of turbine driven ships in a manner utilizing the entire original turbine installation and most of the original boiler installation but without increasing the space allotted to the power plant of the ship, thereby obtaining the needed additional power for increasing the speed of the ship to the necessary amount at a relatively small cost.

It is well known that the majority of turbine driven ships are able to develop considerably less horse power for going astern than for going ahead. In emergencies, this deficiency is a very serious matter and it is an object of the present invention to provide for increasing the horse power of existing turbine power plants in a manner that not only requires no space in addition to that usually allotted to the ship's power plant, but which increases the ratio of the astern power to the ahead power.

The novel features of my invention are pointed out in the appended claims. The invention itself, however, together with further objects and advantages, will best be understood from a detailed description of my method of enlarging existing turbine power plants and of a power plant arrangement resulting from enlarging the existing plant in accordance with my said method, and such a description will now be given in connection with the accompanying drawings illustrating a turbine power plant embodying my invention and in which Fig. 1 is a diagrammatic view of a power plant whose horse power has been enlarged in accordance with my invention;

Fig. 2 is an elevation of a valve arrangement for controlling steam for the plant according to Fig. 1, parts being broken away and parts being shown in section for purposes of illustration;

Fig. 3 is a section on the line 3—3 of Fig. 2 looking in the direction of the arrows.

The turbine power plant whose diagram appears in Fig. 1 is assumed to have had an original cross compound turbine installation comprising two shafts 10 and 12 coupled by gearing 14 to a propeller shaft 16. Assuming that the original installation was designed to utilize steam at 200 lbs. gauge pressure, the original installation is shown as having an original 200 lb. ahead stage 18 and an original 200 lb. astern stage 20, whose rotors are both affixed to shaft 10. The original installation also had an original low pressure ahead stage 22 and an original low pressure astern stage 24 both having rotors fixed to the shaft 12. Steam at 200 lbs. gauge for the stages 18 and 20 was furnished by the original steam main 26 and controlled by valves 3 and 4 for stages 18 and 20 respectively. As is usual in such installations, valves 3 and 4 were operated by a mechanism insuring that only one of the valves such as 3 or 4 would be opened at a time. When valve 3 opened, steam passed through stage 18 and thence by connecting pipe 28 to low pressure stage 22 from which it exhausted through line 30 to a condenser, not shown. If, however, valve 3 were closed and valve 4 opened, steam from main 26 would pass through the original high pressure astern stage 20 and thence by connecting pipe 32 to the original low pressure astern stage 24. From stage 24 steam could exhaust through pipe 30 to the condenser.

It having become necessary to enlarge the horse power of the ship or station containing the original stages 18, 20, 22 and 24, one or more of the original boilers furnishing approximately ⅓ of the 200 lb. steam required by the original turbine installation is removed and substituted by a higher pressure boiler or boilers furnishing the same weight of steam at least twice the pressure of the original boiler installation, or say 400 lbs. gauge. Steam from such added or substituted boiler capacity is supplied to the enlarged turbine power plant through a main 34, the original main 26 and the valves 3 and 4 being retained. To utilize the higher pressure steam from main 34 the ahead stages 36 and 36a and the astern stages 38 and 38a are added to the original installation. Stages 36 and 38 have their rotors fixed to an extension shaft 40 coupled to the original shaft 10, as indicated at 42, while stages 36a and 38a have their rotors fixed to an extension shaft 44 shown as coupled to the original shaft 12 at 46. Steam for the ahead stages 36 and 36a may conveniently be taken from main 34 through the valve 2 from which point it is shown as passing to the stages by pipe 48 having branches 50 and 50a. Similarly, steam for the astern stages 38 and 38a may be taken from main 34 through valve 1 from which point it is conducted to the stages by pipe 52 having branches 54 and 54a connecting to the stages. The original connections between main 26 and stages 18 and 20 and the original connections from stage 18 to stage 22 and from stage 20 to stage 24 are retained in the renovated installation.

In the operation of the enlarged installation comprising stages 36, 36a and 38 and 38a in addition to the original stages 18, 20, 22 and 24, during forward running, steam is exhausted from ahead stages 36 and 36a at 200 lbs. and passes through connecting pipes 56, 56a and 58 to stage 18 where it is used along with steam supplied from the original 200 lb. main 26. Normally, enough steam is taken at high pressure from main 34 so that when exhausted from stages 36 and 36a it will supply approximately ⅓ the total steam requirement of stage 18. Similarly, during reverse running, steam from high pressure main 34 which is passed through astern stages 38 and 38a is exhausted at 200 lb. pressure into pipes 60 and 60a from which it flows through pipe 62 to astern stage 20, stages 38 and 38a being so designed that they supply substantially ⅓ or more of the steam required by stage 20. From stages 18 and 20 the steam passes as before, the piping between the original stages being kept intact. It will be seen, therefore, that stages 18, 22, 20 and 24 all operate, after the enlargement of the plant, under the same conditions as before, the addition of stages 36, 36a, 38 and 38a acting merely to increase the output of the plant.

It will be seen that astern stages 20 and 24 are of smaller size than ahead stages 18 and 22, this being the usual practice in turbine plants on shipboard. However, I find that there is usually sufficient space provided in the original engine rooms so that the astern stages 38 and 38a can be made of the same size as the ahead stages 36 and 36a whereby the ratio of the power available for astern running to that for ahead running is increased with slight additional expense. The stages 36 and 36a are, of course, both made the same size.

For controlling the steam to the enlarged plant I have shown in Figs. 2 and 3 a standard arrangement for operating the valves 1, 2, 3 and 4. The valves are all operated from a single rock shaft 64 having lever arms 66 and 68 projecting from it on one side for operating valves 2 and 3 respectively and lever arms 70 and 72 projecting from it on the other side for operating valves 1 and 4. Each of valves 1 to 4 inclusive has a stem 74 fixed to the valve at one end of the stem, such stem having a collar 76 slidable thereon near its other end. Each collar 76 is coupled to one of the levers 66, 68, 70, 72 by links 78. When the shaft 64 is turned in the direction for ahead running, collars 76 for the ahead valves are raised on the stems 74 and contact with nuts 80 fixed to the upper ends of the stems so as to raise the corresponding valves. If the shaft 64 is turned in an opposite direction, the other pair of collars 76 for the astern valve are raised to open the corresponding valves in the same way. The collars 76 are mounted near the upper ends of the stems 74 and have room to slide downwardly on the stems compressing springs 82 so that when they are forced downwardly by the links 78 no effect is produced and one set of valves is not affected when those of the other set are opened. The valves 1, 2, 3 and 4 each is normally held closed by a pair of springs 82 and 84. A wheel 86 and worm gearing 88 is provided for turning the shaft 64 in either direction as desired from its neutral position. It has been found economical in packing and space to place the added ahead stages 36 and 36a adjacent the original ahead stages 18 and 22 and so that stages 36 and 36a lie between added astern stages 38 and 38a and original stages 18 and 22.

While I have described a particular method of enlarging existing turbine power plants and the particular arrangement resulting from such enlargement, it will be understood that I do not limit myself to the details of my foregoing disclosure except as such details are clearly and positively included in the appended claims. In particular, it will be understood that the invention is not limited to a cross-compound installation.

Further, it will be understood that the word "coupled" as used to describe the relationship between shaft 40 and shaft 10 is to be construed in the broad sense to cover any means including gears for transmiting power and as it is used in describing the relationship between shaft 10 or shaft 12 and shaft 16.

Further, I do not limit myself to replacing one-third of the original boiler units with higher pressure boilers, since, often one-half, or more, of the original boilers may be so replaced.

I claim:

1. A cross compound turbine installation comprising a high pressure forward stage, an intermediate pressure forward stage, a high pressure reverse stage and an intermediate pressure reverse stage all driving on one shaft, a high pressure forward stage, a high pressure reverse stage, a low pressure forward stage and a low pressure reverse stage driving on a second shaft, means for supplying steam to said high pressure forward stages during periods of forward running, means for transferring steam which has been used in said high pressure forward stages to said intermediate forward stage, means for transferring steam which has been used in said intermediate forward stage to said low pressure forward stage, means for supplying steam to said high pressure astern stages during periods of reverse running, means for transferring steam which has been used in said high pressure astern stages to said intermediate astern stage and means for transferring steam which has been used in said intermediate astern stage to said low pressure astern stage.

2. A cross compound turbine installation as set forth in claim 1 together with means for supplying additional steam of intermediate pressure to the forward intermediate stage when the forward high pressure stages are in action and to the reverse intermediate stage when the reverse high pressure stages are in action.

3. The combination in a turbine installation of two parallel shafts, a high pressure forward stage and a high pressure reverse stage on each of said shafts, an intermediate forward stage and an intermediate reverse stage on one of said shafts, a low pressure forward stage and a low pressure reverse stage on the other of said shafts, connections for leading steam from both said high pressure forward stages to said intermediate forward stage and from both said high pressure reverse stages to said intermediate reverse stage and from said intermediate stages to said low pressure stages, and an additional intermediate steam supply to said intermediate stages.

GEO. E. KERSHAW.